United States Patent
Visenzi

(10) Patent No.: US 11,623,708 B2
(45) Date of Patent: Apr. 11, 2023

(54) LUGGAGE OF A MOTORCYCLE

(71) Applicant: GIVI S.P.A., Flero (IT)

(72) Inventor: Giuseppe Visenzi, Brescia (IT)

(73) Assignee: GIVI S.P.A., Flero (IT)

( * ) Notice: Subject to any disclaimer, the term of this patent is extended or adjusted under 35 U.S.C. 154(b) by 0 days.

(21) Appl. No.: 17/429,842

(22) PCT Filed: Apr. 7, 2020

(86) PCT No.: PCT/IB2020/053307
§ 371 (c)(1),
(2) Date: Aug. 10, 2021

(87) PCT Pub. No.: WO2020/208520
PCT Pub. Date: Oct. 15, 2020

(65) Prior Publication Data
US 2022/0081052 A1 Mar. 17, 2022

(30) Foreign Application Priority Data

Apr. 9, 2019 (IT) .................. 102019000005450

(51) Int. Cl.
B62J 9/24 (2020.01)
B62J 9/27 (2020.01)
B62J 7/08 (2006.01)

(52) U.S. Cl.
CPC . B62J 9/24 (2020.02); B62J 7/08 (2013.01); B62J 9/27 (2020.02)

(58) Field of Classification Search
CPC ......... B62J 9/24; B62J 9/23; B62J 9/27; B62J 9/30; B62J 7/04; B62J 7/08; B62J 7/30
See application file for complete search history.

(56) References Cited

U.S. PATENT DOCUMENTS 8,152,036 B2 * 4/2012 Visenzi ............... B62J 9/27
224/419
8,864,002 B2 * 10/2014 Iida ..................... B62J 7/04
224/430

(Continued)

FOREIGN PATENT DOCUMENTS

CN 1314279 A 9/2001
CN 1478691 A 3/2004

(Continued)

OTHER PUBLICATIONS

International Search Report dated Jun. 17, 2020 in PCT/IB2020/053307 filed Apr. 7, 2020, 4 pages.

(Continued)

Primary Examiner — Corey N Skurdal
(74) Attorney, Agent, or Firm — Oblon, McClelland, Maier & Neustadt, L.L.P.

(57) ABSTRACT

A luggage of a motorcycle separably associated with a support frame to be associable with a frame of a motorcycle. The support frame includes an engageable element. The luggage of a motorcycle includes a control mechanism including at least one control lever, a hooking mechanism including at least one engagement element being adapted to pass from a position of engagement with the engageable element of the support frame and a position of disengagement from the engageable element, and a lever system including at least one cord including a first end connected to the control mechanism and a second end connected to the hooking mechanism.

10 Claims, 11 Drawing Sheets

(56) References Cited

U.S. PATENT DOCUMENTS

| | | | |
|---|---|---|---|
| 2004/0149792 A1 | 8/2004 | Akita et al. | |
| 2012/0312849 A1* | 12/2012 | Schanz | B62J 9/27 |
| | | | 224/413 |
| 2013/0043289 A1* | 2/2013 | Visenzi | B62J 9/30 |
| | | | 224/449 |
| 2015/0019121 A1 | 7/2015 | Visenzi | |
| 2015/0191946 A1 | 7/2015 | Nishida et al. | |
| 2018/0304950 A1 | 10/2018 | Visenzi | |

FOREIGN PATENT DOCUMENTS

| | | |
|---|---|---|
| CN | 2696972 Y | 5/2005 |
| CN | 104602998 A | 5/2015 |
| CN | 207241874 U | 4/2018 |
| CN | 109436146 A | 3/2019 |
| EP | 1 065 139 A1 | 1/2001 |
| EP | 1 369 344 A1 | 12/2003 |
| GB | 437079 A | 10/1935 |
| WO | WO 2014/024141 A1 | 2/2014 |

OTHER PUBLICATIONS

Combined Chinese Office Action and Search Report dated Apr. 7, 2022 in Chinese Patent Application No. 202080015341.X (with English translation), 16 pages.

Combined Chinese Office Action and Search Report dated Nov. 2, 2022 in Chinese Patent Application No. 202080015341 (with English translation), 12 pages.

* cited by examiner

Fig. 5
Fig. 6
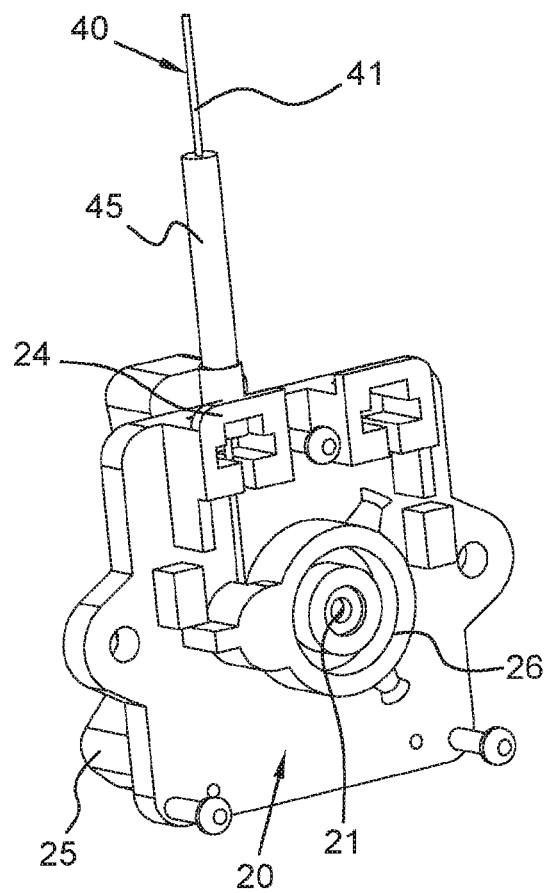
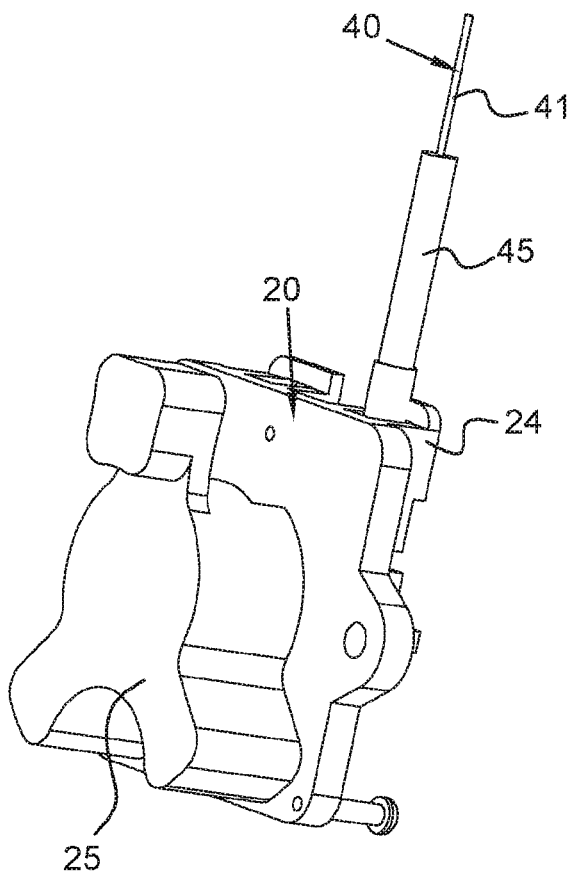

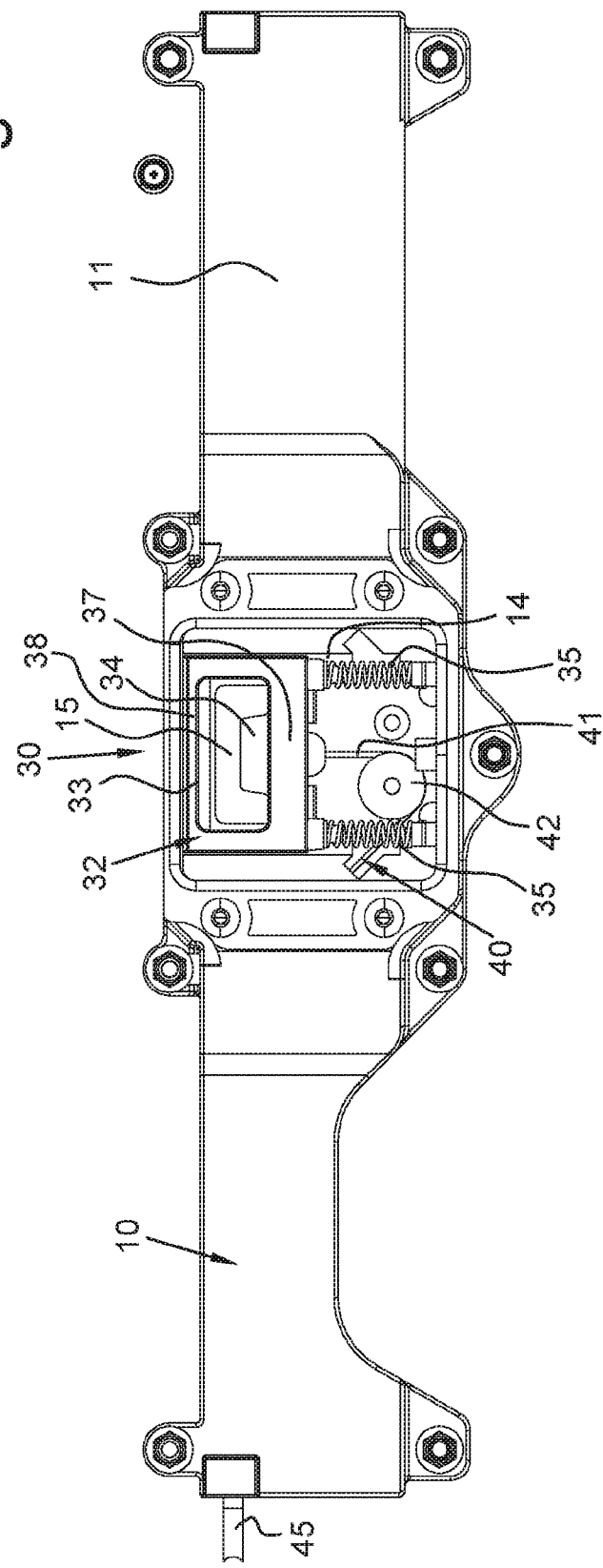

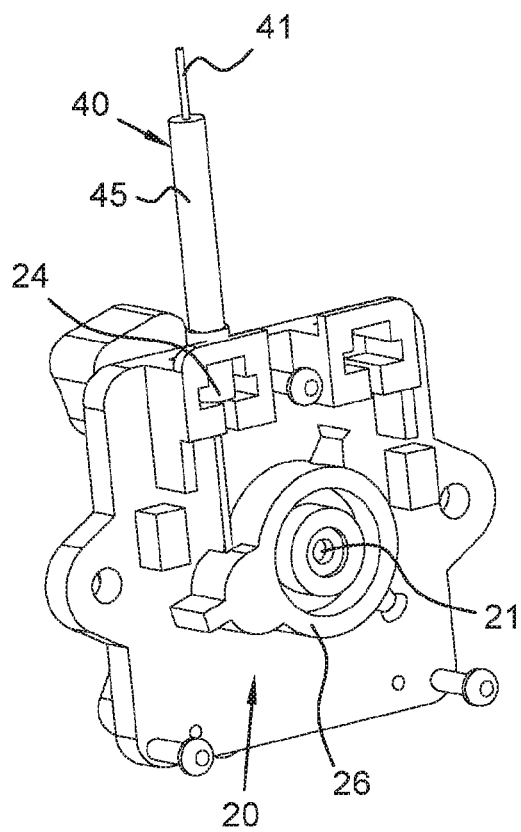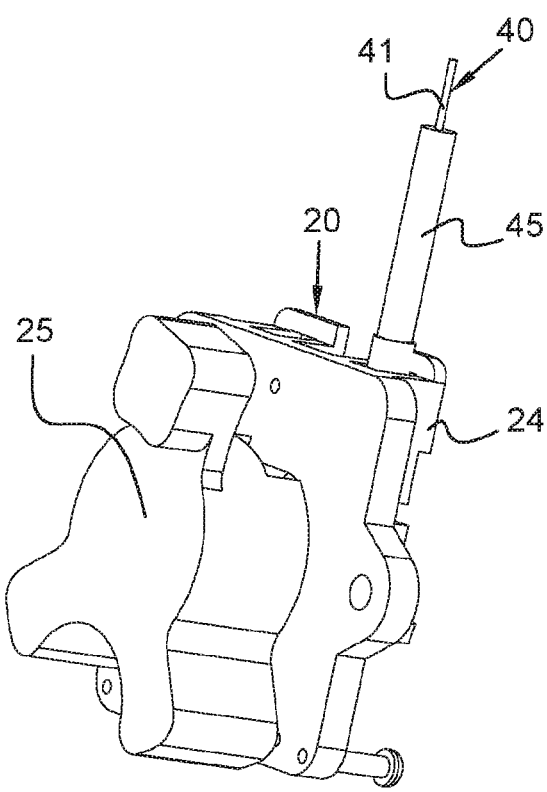

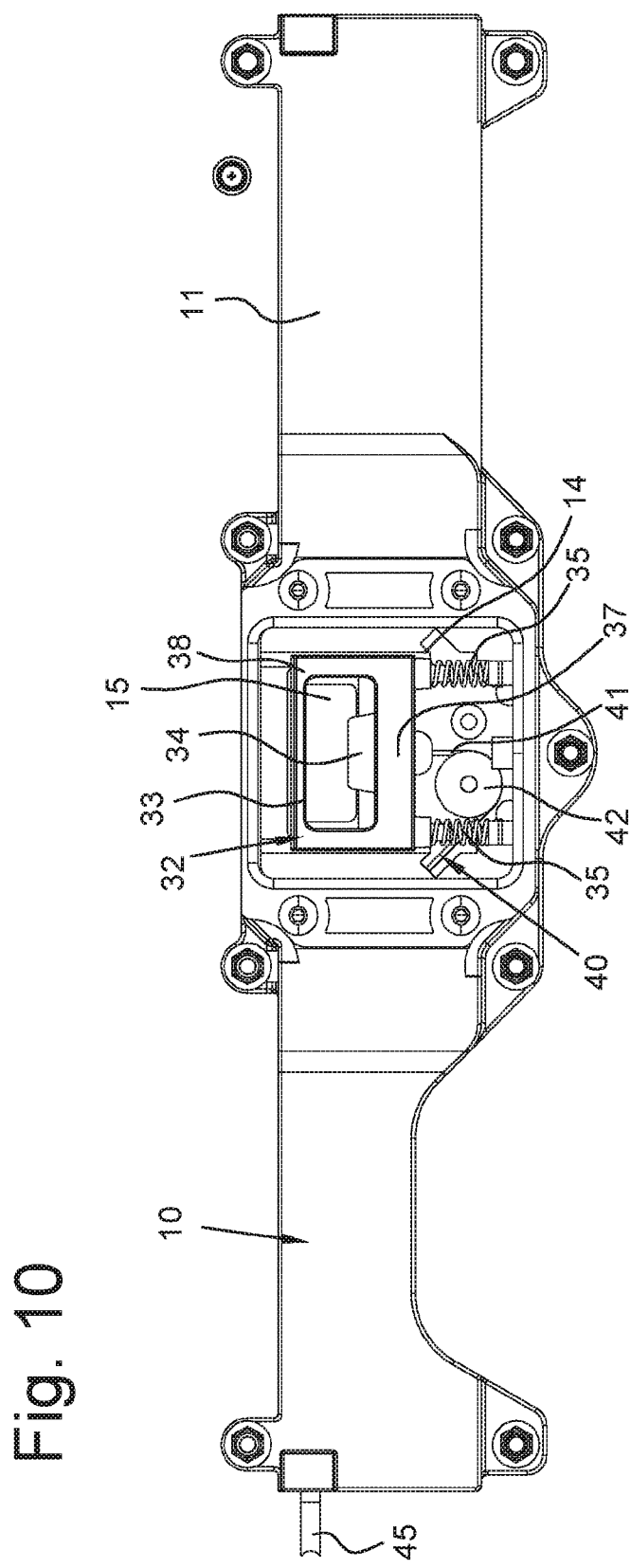

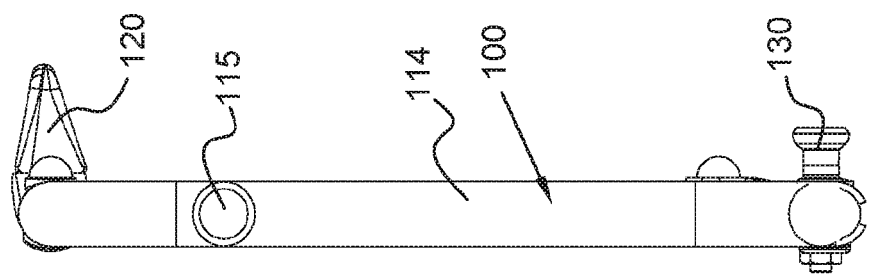
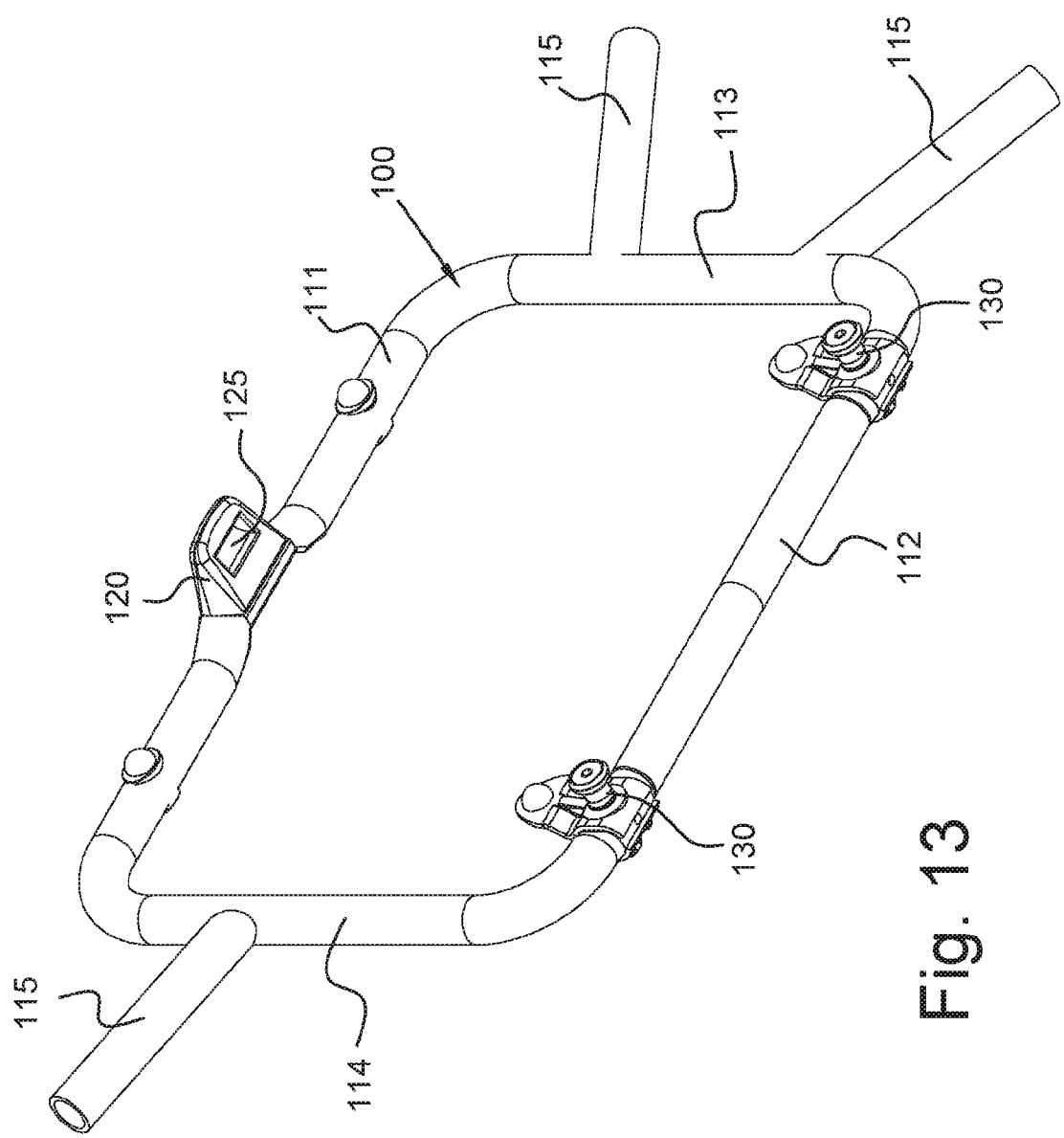

LUGGAGE OF A MOTORCYCLE

The present invention relates to a luggage of a motorcycle.

In the state of the art, luggages of a motorcycle are known, separably mounted with support frames associable with a motorcycle.

Disadvantageously, the luggages are separably mountable with the support frames by means of engagement elements, which are positioned directly in contact with the support frame and in positions, which are difficult to access, complicating the assembly and disassembly of the luggages from the support frames.

It is an object of the present invention to realize a luggage of a motorcycle, which can easily be assembled and disassembled from a support frame associable with the motorcycle, that the control mechanism for assembling and disassembling the luggage is easily accessible and safe and that it overcomes the drawbacks of the prior art.

According to the invention, such object is achieved with a luggage of a motorcycle according to claim 1.

It is a further object of the present invention to make an assembly kit, which allows a luggage of a motorcycle to easily be assembled and disassembled from a support frame associable with the motorcycle, that the control mechanism for assembling and disassembling the luggage is easily accessible and safe and that it overcomes the drawbacks of the prior art.

According to the invention, such further object is achieved with an assembly kit according to claim 10.

Other features are provided in the dependent claims.

The features and advantages of the present invention will be more apparent from the following description, which is to be understood as exemplifying and not limiting, with reference to the appended schematic drawings, wherein:

FIG. 1 is an axonometric perspective view, which shows a luggage of a motorcycle, comprising a rear wall mounted with a support frame associable with the motorcycle according to the present invention, the luggage comprises a side wall, which is easily accessible by a person where a lever is present for controlling a control mechanism of the luggage, which allows the luggage to pass from an engaged position with the support frame to a disengaged position from the support frame;

FIG. 5 shows an enlarged perspective view of the control mechanism seen from inside the luggage with a cam of the control lever in the first position;

FIG. 6 shows an enlarged perspective view of the control mechanism seen from outside the luggage with the control lever in the first position;

FIG. 7 shows an internal view of the hooking mechanism comprising the engagement element in the engagement position, which is mounted on two guides, which allow the engagement element to slide with respect to the rear wall of the luggage, the two guides comprise elastic return elements in the position of maximum elongation;

FIG. 8 shows an enlarged perspective view of the control mechanism seen from inside the luggage with a cam of the control lever in the second position;

FIG. 9 shows an enlarged perspective view of the control mechanism seen from outside the luggage with the control lever in the second position;

FIG. 10 shows an internal view of the hooking mechanism comprising the engagement element in the disengagement position and the elastic return elements in the position of minimum elongation;

FIG. 13 is a perspective axonometric view of the support frame of the assembly kit according to the present invention, seen from the front, which shows the engageable element extending towards the rear wall of the luggage and the engageable means;

FIG. 14 is a side view of the support frame in FIG. 13.

Figure 1:
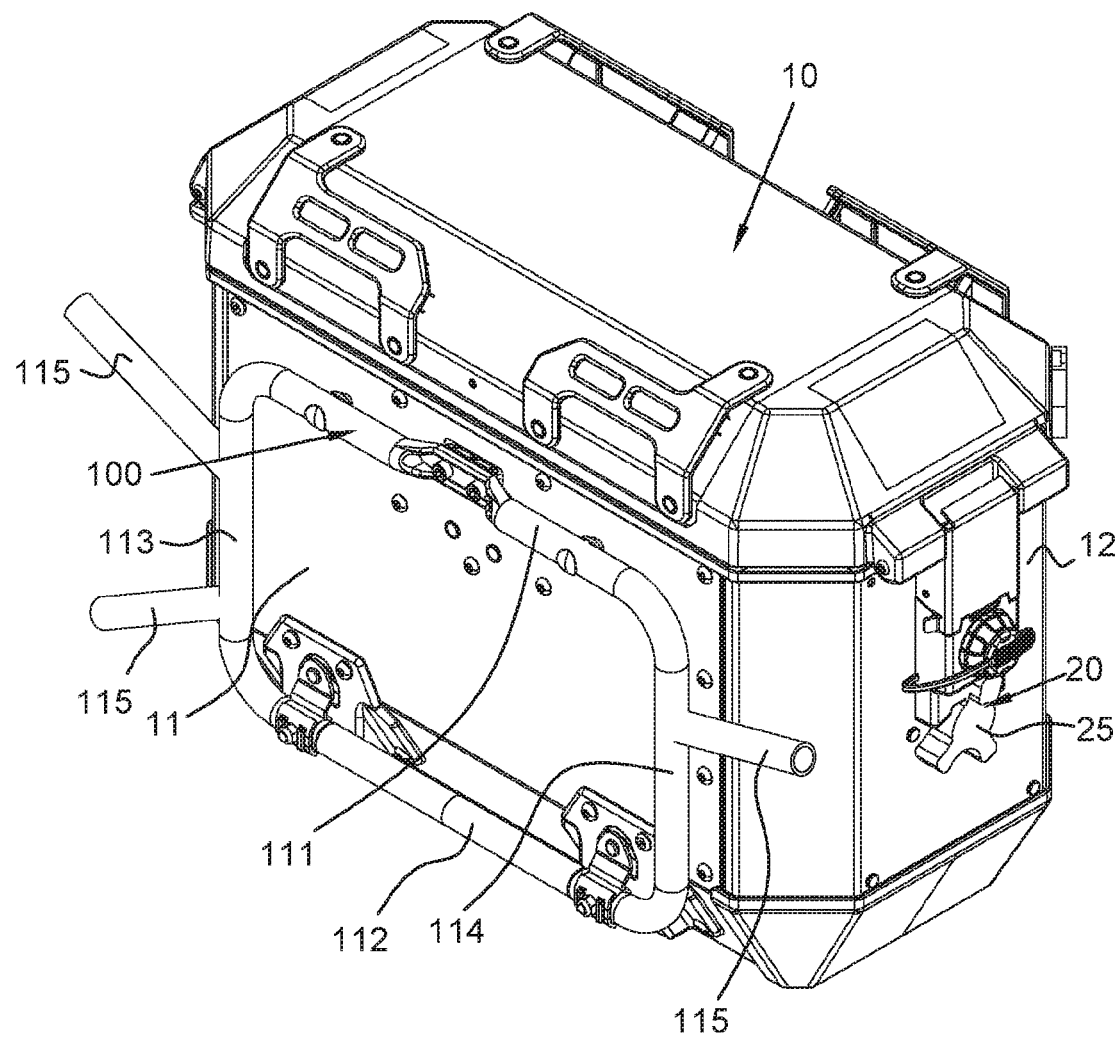

With reference to the described figures, an assembly kit is shown comprising at least one luggage of a motorcycle 10, and a support frame 100 configured to be associable with a frame of a motorcycle.

Said support frame 100 comprises at least one tubular element 111-114 comprising at least one engageable element 120 for each luggage 10.

Only one luggage 10 and only one engageable element 120 is shown in FIGS. 1-14, however, alternatively, it is possible to comprise a variety of luggages 10, each of which is respectively separably mountable with a respective engageable element 120 of a variety of engageable elements 120 mounted on different portions of the support frame 100 so as to be able to mount said variety of luggages 10. For example, it can be comprised that each tubular element 111-114 includes a respective engageable element 120.

As shown in detail in FIGS. 1, 2, 11, 13-14 the support frame 100 comprises four tubular elements 111-114 arranged according to a quadrangular configuration, which comprises an upper tubular element 111, two lateral tubular elements 113 and 144 and a lower tubular element 112. The lateral tubular elements 113 comprise at least one further tubular element 115 adapted to be associated with said frame of the motorcycle. The upper tubular element 111 mounts said engageable element 120.

The engageable element 120 extends towards a rear wall 11 of the luggage 10 and it is adapted to be inserted into a through opening 15 of said luggage 10, which is hollowed out in the rear wall 11 of the luggage 10.

The engageable element 120 further comprises a through opening 125, which allows a passage through, from an upper portion to a lower portion of the engageable element 120.

The luggage 10 comprises the rear wall 11, which passes from a position of engagement with the support frame 100 to a position of disengagement from the support frame 100.

The luggage 10 comprises a side wall 12, which can easily be accessed by a person. The luggage 10 comprises a control mechanism 20 comprising at least one control lever 25.

The control mechanism 20 is securely mounted with the side wall 12 of the luggage 10 so that it is easily accessible and makes it advantageously easy to control the assembly and disassembly of the luggage 10 on/from the support frame 100.

The luggage comprises a hooking mechanism 30, which comprises at least one engagement element 32.

The engagement element 32 passes from a position of engagement with said engageable element 120 of said support frame 100 to a position of disengagement from said engageable element 120.

The luggage 10 comprises a lever system 40, comprising a cord 41 comprising a first end connected to said control mechanism 20 and a second end connected to said hooking mechanism 30.

Said engagement element 32 is slidably mounted with said luggage 10 to pass from said position of engagement to said position of disengagement with said engageable element 120.

As shown in FIGS. 3, 4, 7, 10 the engagement element 32 is slidably mounted in a seat 14 hollowed out in the rear wall 11 of the luggage 10.

Said engagement element 32 is connected to said second end of said cord 41 of said lever system 40. As shown in detail in FIGS. 7 and 10 the second end of the cord 41 is mounted with a lower portion 37 of the engagement element 32.

Said hooking mechanism 30 comprises two elastic return elements 35 mounted on sliding guides 36 for said engagement element 32. The sliding guides 36 are vertically arranged cylinders, mounted on top of each of which is the elastic return element 35, which is a helicoidal spring. Each elastic return element 35 passes from a position of maximum elongation to a position of minimum elongation. The position of maximum elongation of the elastic return element 35 corresponds to said position of engagement between said engagement element and said engageable element 120. Said position of minimum elongation of the elastic return element 35 corresponds to said position of disengagement between said engagement element 32 and said engageable element 120.

Alternatively, it is possible to comprise only one elastic return element 35.

The through opening 15 of the rear wall 11 of the luggage 10 is arranged at said hooking mechanism 30. The through opening 15 is adapted to allow a passage of said engageable element 120 of the support frame 100 between an exterior of said luggage 10 and said hooking mechanism 30 so that said engagement element 32 can pass from said position of engagement to said position of disengagement with said engageable element 120.

In the position of disengagement of the engagement element 32 it is possible to pass the luggage 10 from the position of engagement with the support frame 100 to the position of disengagement from the support frame 100.

As shown in detail in FIGS. 7 and 10 the engagement element 32 comprises a through opening 33 adapted to allow a passage of said engageable element 120.

The engageable element 120 passes through the through opening 15 of the rear wall 11 of the luggage 10 and it passes through the through opening 33 of the engagement element 32 when said engagement element 32 is in the position of disengagement.

Said engagement element 32 of said hooking mechanism 30 comprises an engagement tooth 34 adapted to be engaged with a respective seat 125 of said engageable element 120.

Alternatively, it is possible to comprise that the seat 125 is not through but configured only as a cavity hollowed out in the lower portion of the engageable element 120, where said cavity is adapted to receive the engagement tooth 34 when the engagement element 32 passes into the position of engagement.

As shown in particular in FIG. 13, said at least one engageable element 120 comprises a seat 125 for said engagement tooth 34 of said engagement element 32 of said at least one luggage 10, where said seat 125 is a through opening having such dimensions as to allow said engagement tooth 34 to pass therethrough.

The engagement element 32 is in the form of a quadrangle and comprises the lower portion 37 and an upper portion 38 divided by the through opening 33 of engagement element 32. The engagement tooth 34 extends upwards in a vertical direction from the lower portion 37 of the engagement element 32. The engagement tooth 34 extends inside the through opening 33 of the engagement element 32.

The through opening 33 must allow the passage of the engageable element 120 when the engageable element 32 is in the position of disengagement, thus a sufficient vertical space is comprised between an upper end of the engagement tooth 34 and the upper portion 38 of the engagement element 32 to allow the engageable element 120 to be able to pass through the through opening 33 of the engagement element 32 in the position of disengagement of the engagement element 32.

As shown in detail in FIGS. 3, 4, 7 and 10 said lever system 40 comprises at least one pulley 42 adapted to allow a sliding of said cord 41. Said pulley 42 is rotatably mounted at said hooking mechanism 30. When the control lever 25 is rotated from the first to the second position, then the cord 41 is pulled. Advantageously, the pulley 42 allows the engagement element 32 to be pulled from the top to the bottom, reducing the effort needed to dismantle the luggage 10 from the support frame 100, where, in the top position, the engagement element 32 is in the position of engagement and in the bottom position, the engagement element is in the position of disengagement.

Said control lever 25 is rotatably mounted with the side wall 12 of the luggage 10. The control lever 25 can be mounted to any wall of the luggage 10 to assist the operation of assembly and disassembly of the luggage 10 facilitating the accessibility of said control lever 25 by the person.

Said control lever 25 is connected to said second end of said cord 41 of said lever system 40. Said control lever 25 rotates about a pin 21 passing from a first position to a second position. The pin 21 is hinged to the side wall 12. Said first position corresponds to said position of engagement between said engagement element 32 and said engageable element 120 and said second position corresponds to said position of disengagement between said engagement element 32 and said engageable element 120.

Said second position of said control lever 25 comprises that said control lever 25 pulls said cord 41 causing said engagement element 32 to pass from said position of engagement to said position of disengagement with said engageable element 120.

As shown in detail in FIGS. 3, 4, 5, 7 the control lever 25 comprises a cam 26 mounted inside the luggage 10. The cam 26 is connected to the first end of the cord 41 of the lever system 40.

The lever system 40 comprises a cover 45 adapted to allow the passage of the cord 41 therein. The cover 45 is mounted with the control mechanism 20 by means of a stop portion 24 of the control mechanism 20, which retains the cover 45.

Figure 2:
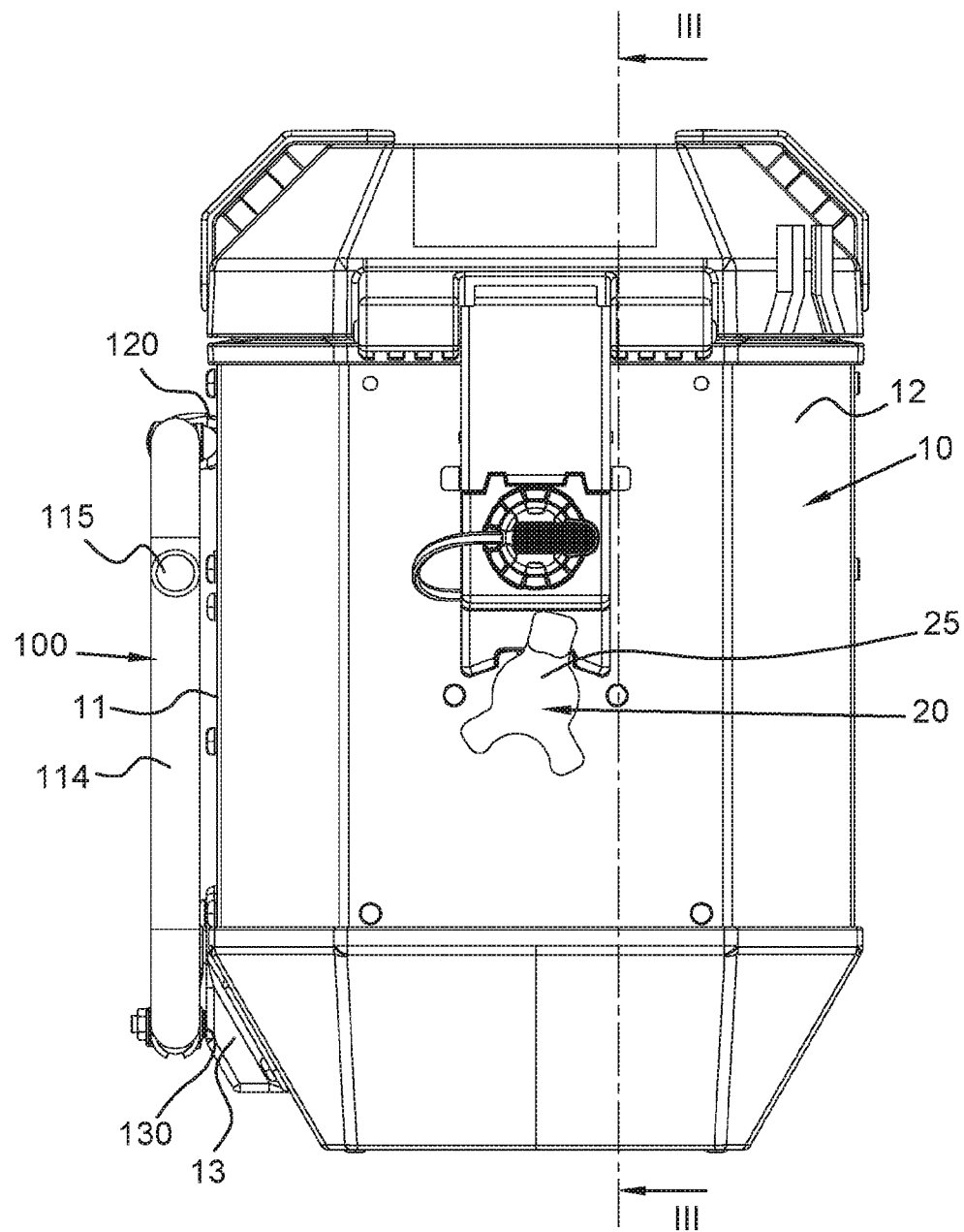
FIG. 2 is a side view of a wall of the luggage mounted with the support frame in FIG. 1 where the control lever of the control mechanism of the luggage is present.
Figure 3:
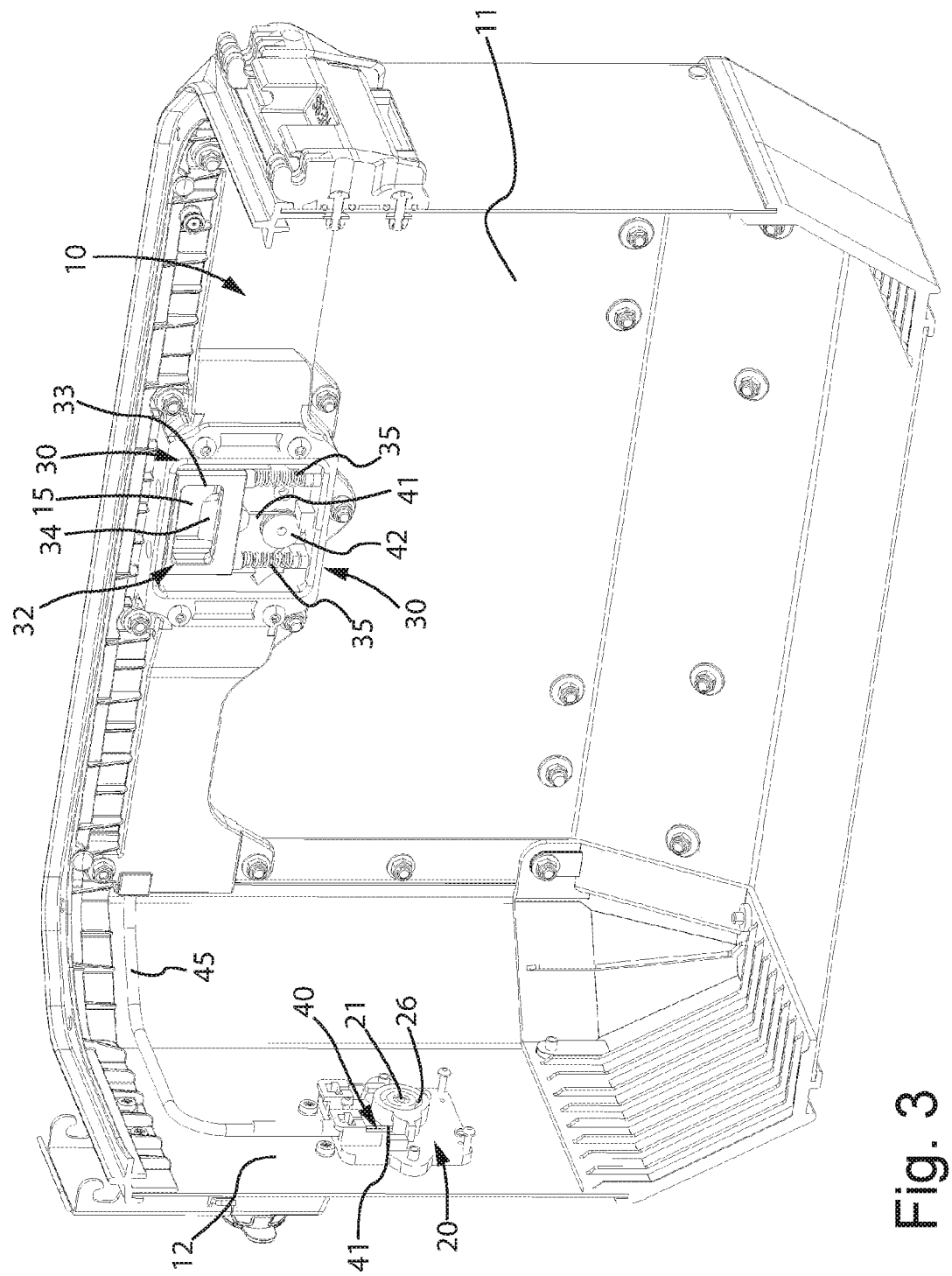
FIG. 3 is a perspective view of a section of the luggage according to the line III-III in FIG. 2, showing the inside of the luggage, the control mechanism, a lever system and a hooking mechanism of the luggage.
Figure 4:
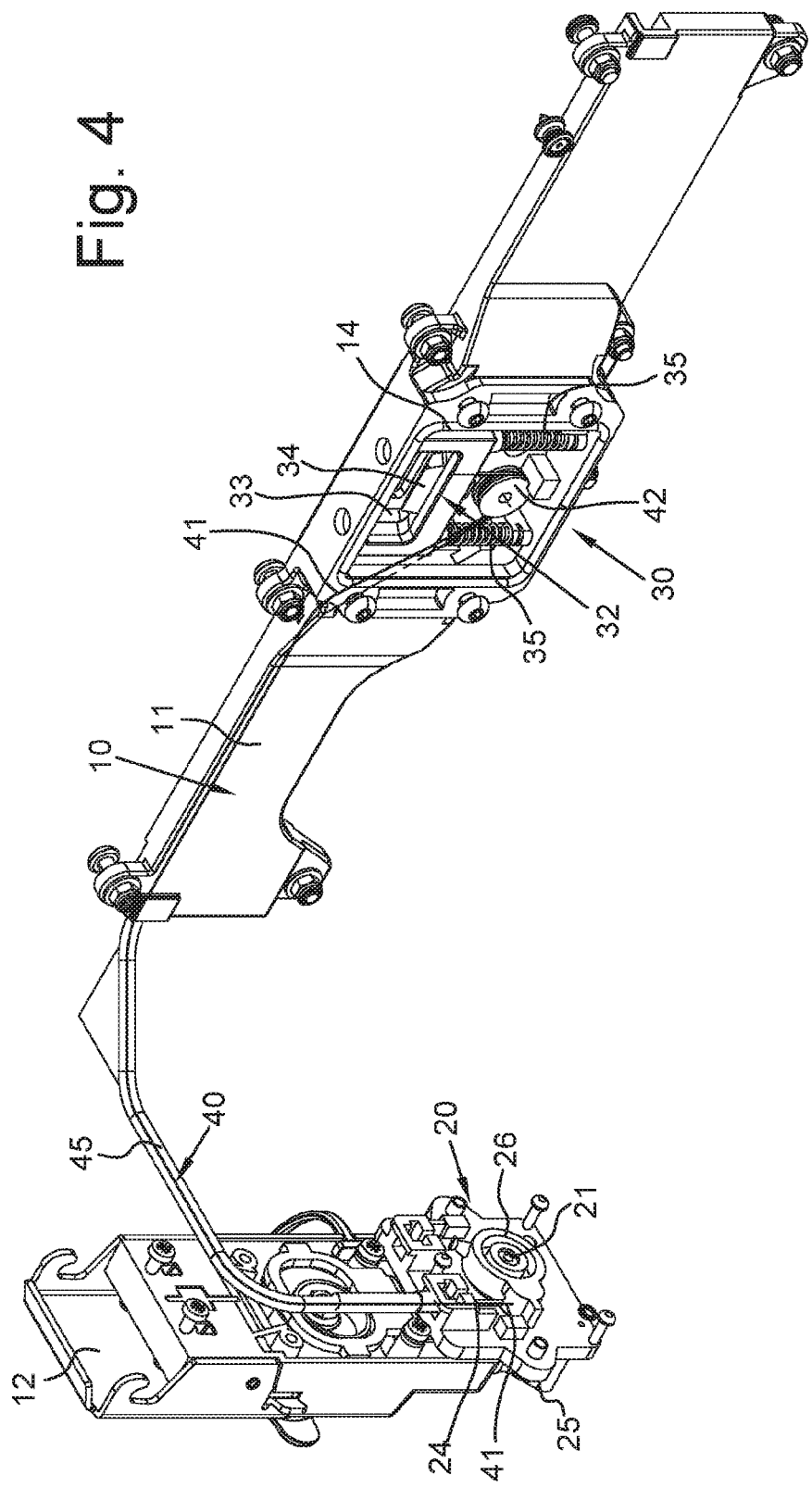
FIG. 4 shows an enlargement of the perspective view in FIG. 3 where the hooking mechanism comprises an engagement element in the engaged position and the control lever of the control mechanism is in the first rotation position.
Figure 11:
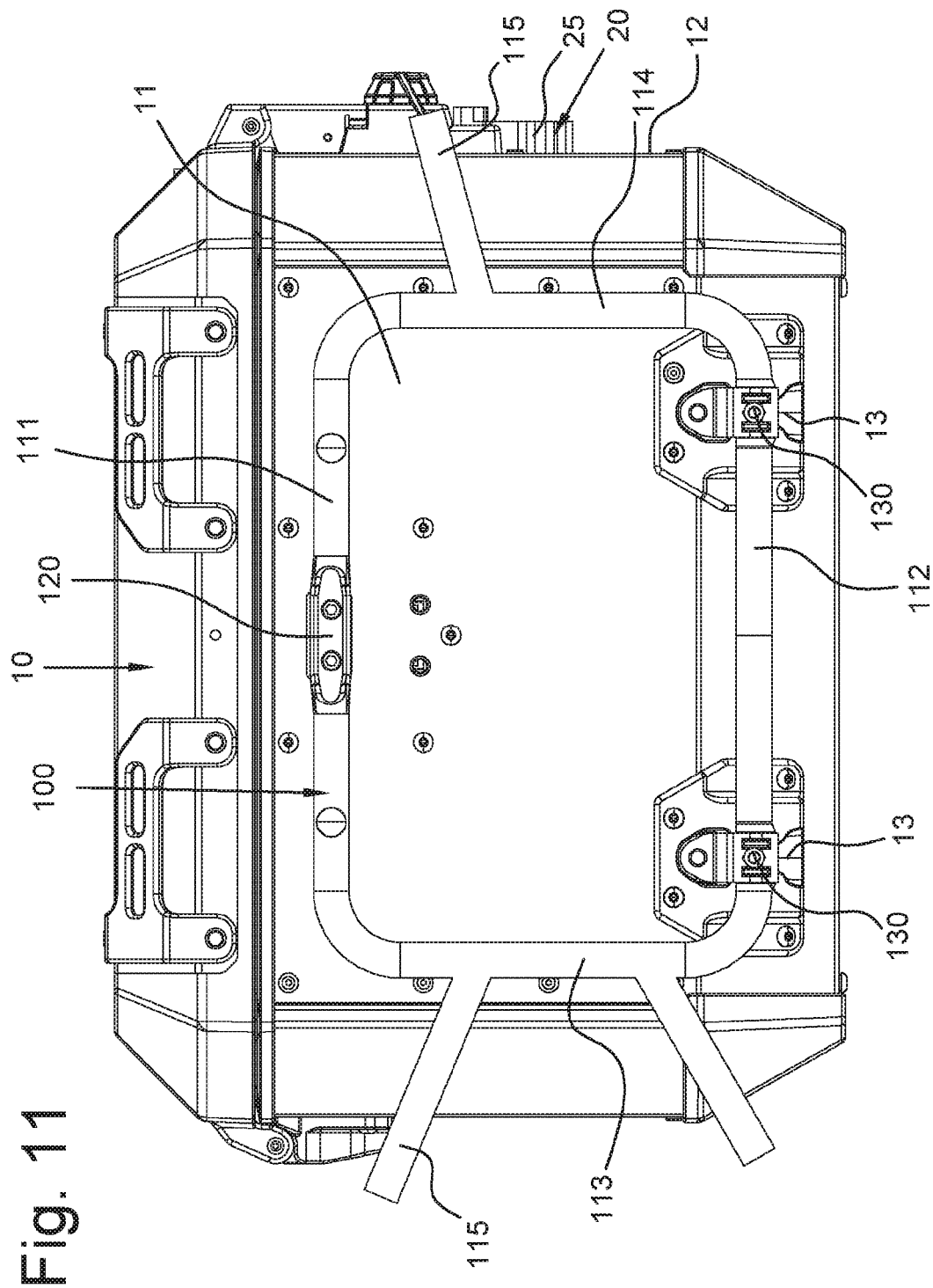
FIG. 11 is a rear view of the luggage of the motorcycle mounted with the support frame associable with the motorcycle.
Figure 12:
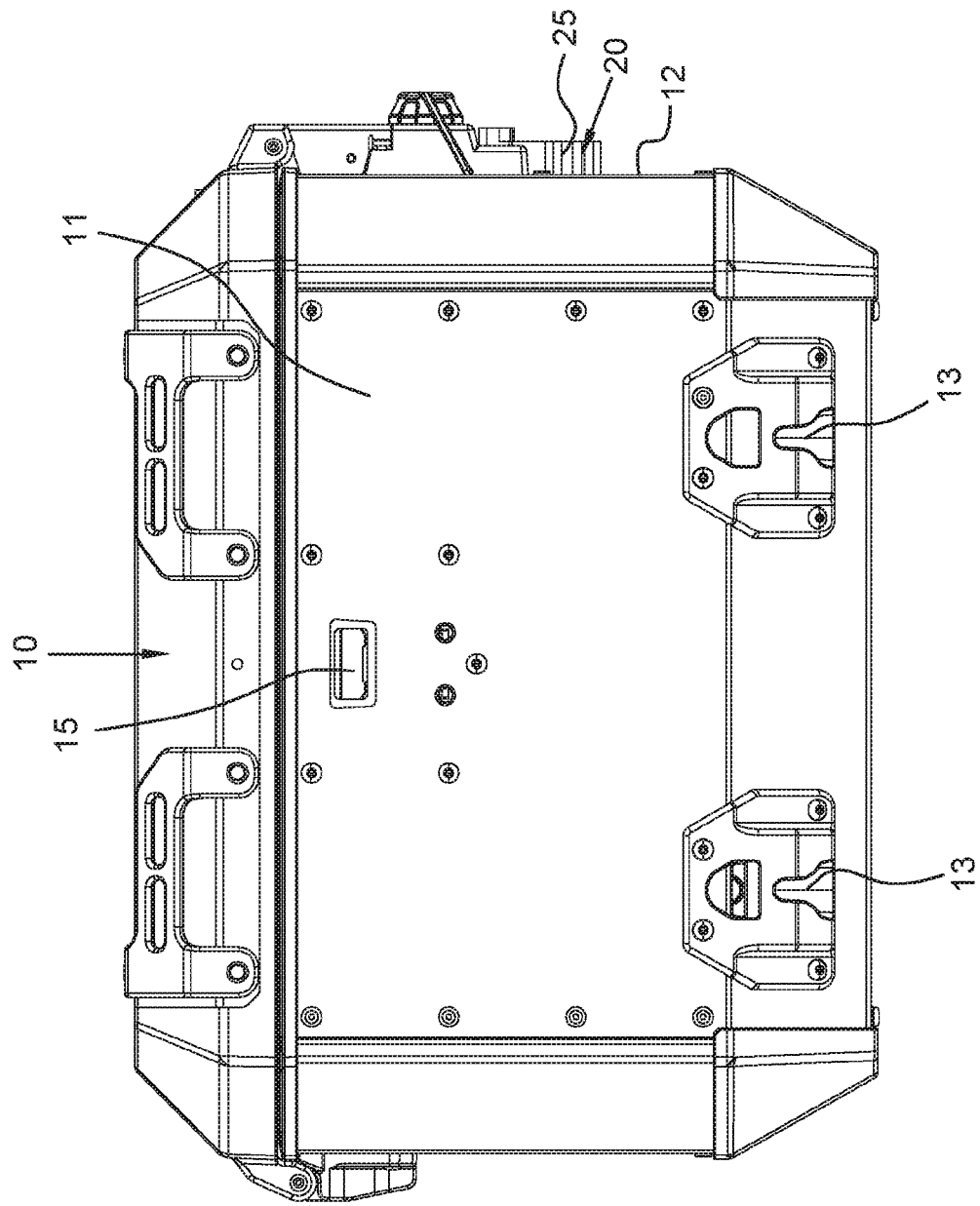
FIG. 12 is a view of the rear wall of the luggage of the motorcycle disengaged from the support frame, where the rear wall of the luggage comprises a through opening adapted to allow the insertion of an engageable element of the support frame and engagement means for relative engageable means of the support frame.

As shown in detail in FIGS. 2, 6 and 8, the control lever 25 is knob-shaped to facilitate the rotation thereof by a person who can operate the control lever 25 in a simpler manner.

As shown in detail in FIGS. 11-14, the rear wall 11 of the luggage 10 comprises engagement means 13 for relative engageable means 130 of the support frame 100, which are engaged by interlocking with each other.

With regard to operation the luggage 10 is mounted with the support frame 100 causing it to pass from the position of disengagement from the support frame 100 to the position of engagement with the support frame 100.

The control lever 25 passes from the first position to the second position controlling the engagement element 32 through the lever system 40.

The engagement element 32 controlled by the control lever 25 of the control mechanism 20 passes from the position of engagement to the position of disengagement to allow the passage of at least one portion of the engageable element 120 to pass the through opening 33 of the engagement element 32.

Once the engageable element 120 has passed through the through opening 33 of the engagement element 32, the control lever 25 is brought back into the first position, causing the engagement element 32 to pass into the position of engagement with the engageable element 120. The tooth 34 of the engagement element 32 passes through the through opening 125 of the engageable element 120 preventing the engageable element 120 from being able to exit the through openings 33 and 15 of the engagement element 32 and the rear wall 11 of the luggage 10 respectively. In this way, the luggage 10 is mounted with the support frame 100 and the assembly kit is in the mounted configuration.

Advantageously, the luggage 10 can easily be assembled and disassembled from the support frame 100 associable with the motorcycle, the control mechanism 20 for assembling and disassembling the luggage 10 is easily accessible and safe, overcoming the drawbacks of the prior art.

Advantageously, the assembly kit comprising the luggage 10 and the support frame 100 allows the luggage of a motorcycle 10 to be easily assembled and disassembled from the support frame 100 associable with the motorcycle, the control mechanism 20 for assembling and disassembling the luggage is easily accessible and safe, overcoming the disadvantages of the prior art.

Alternatively, it is possible to comprise that the lever system 40 includes a variety of cords 41 for transmitting the control of the control mechanism 20 to a respective variety of hooking mechanisms 30 positioned on different points of the luggage 10 for engaging a respective variety of engageable elements 120.

Alternatively, the support frame 100 can be a plate comprising at least one engageable element 120. Alternatively, the engagement element 32 can be a hook hinged to the rear wall 11 of the luggage, adapted to pass from the position of engagement with the engageable element 120 to the position of disengagement.

The invention thus conceived is susceptible to many modifications and variants, all falling within the same inventive concept; furthermore, all details can be replaced by equivalent technical elements. In practice, the materials used, as well as the dimensions thereof, can be of any type according to the technical requirements.

The invention claimed is:

1. Luggage of a motorcycle separably associated with a support frame configured to be associable with a frame of a motorcycle, wherein said support frame comprises at least one engageable element, said luggage comprising:
   a control mechanism comprising at least one control lever;
   a hooking mechanism comprising at least one engagement element being configured to pass from a position of engagement with said at least one engageable element of said support frame and a position of disengagement from said at least one engageable element; and
   a lever system comprising at least one cord comprising a first end connected to said control mechanism and a second end connected to said hooking mechanism,
   wherein said lever system comprises at least one pulley configured to allow a sliding of said at least one cord, said pulley being rotatably mounted at said hooking mechanism.

2. The luggage of the motorcycle according to claim 1, wherein said engagement element is slidably mounted with said luggage to pass from said position of engagement to said position of disengagement with said at least one engageable element and said engagement element is connected to said second end of said at least one cord of said lever system.

3. The luggage of the motorcycle according to claim 1, wherein said hooking mechanism comprises at least one elastic return element, which passes from a position of maximum elongation to a position of minimum elongation, said position of maximum elongation corresponds to said position of engagement between said engagement element and said at least one engageable element, and said position of minimum elongation corresponds to said position of disengagement between said engagement element and said one engageable element.

4. The luggage of the motorcycle according to claim 1, further comprising:
   a through opening arranged at said hooking mechanism,
   wherein said through opening is configured to allow a passage of said at least one engageable element between an exterior of said luggage and said hooking mechanism so that said engagement element is configured to pass from said position of engagement to said position of disengagement with said at least one engageable element.

5. The luggage of the motorcycle according to claim 4, wherein said engagement element comprises a through opening configured to allow a passage of said at least one engageable element.

6. The luggage of the motorcycle according to claim 1, wherein said engagement element of said hooking mechanism comprises an engagement tooth configured to be engaged with a respective seat of said at least one engageable element.

7. The luggage of the motorcycle according to claim 1, wherein said control lever is rotatably mounted to said luggage and said control lever is connected to said first end of said at least one cord of said lever system, said control lever being configured to rotate about a pin, passing from a first position to a second position, said first position corresponds to said position of engagement between said engagement element and said at least one engageable element, and said second position corresponds to said position of disengagement between said engagement element and said at least one engageable element.

8. The luggage of the motorcycle according to claim 7, wherein said second position of said control lever comprises that said control lever pulls said at least one cord causing said engagement element to pass from said position of engagement to said position of disengagement with said at least one engageable element.

9. An assembly kit, comprising:
at least one of the luggage of the motorcycle according to claim 1; and
the support frame configured to be associable with the frame of the motorcycle,
wherein said support frame comprises at least one of the engageable element.

10. The assembly kit according to claim 9, wherein said at least one engageable element comprises a seat for an engagement tooth of said engagement element of said at least one luggage, wherein said seat is a through opening having such dimensions as to allow said engagement tooth to pass therethrough.

* * * * *